COMBINED FLOOR POLISHER AND SUCTION CLEANER

Original Filed Jan. 24, 1968 2 Sheets-Sheet 1

COMBINED FLOOR POLISHER AND SUCTION CLEANER

Original Filed Jan. 24, 1966 2 Sheets-Sheet 2

United States Patent Office

Re. 28,022
Reissued May 28, 1974

28,022
COMBINED FLOOR POLISHER AND SUCTION CLEANER

George L. Lamont, Hurlstone Park, New South Wales, Australia, assignor to Contract Cleaning Co. Pty. Limited, Leichhardt, New South Wales, Australia Original No. 3,531,819, dated Oct. 6, 1970, Ser. No. 700,065, Jan. 24, 1968. Application for reissue Sept. 21, 1972, Ser. No. 290,810
Int. Cl. A47l *5/10*
U.S. Cl. 15—385 14 Claims

Matter enclosed in heavy brackets [ ] appears in the original patent but forms no part of this reissue specification; matter printed in italics indicates the additions made by reissue.

ABSTRACT OF THE DISCLOSURE

A combined floor polisher and suction cleaner comprising, in combination, a housing with a rotary brush therein and a suction means within the housing adjacent the brush. A flexible floor contacting skirt depends from the entire periphery of the housing and has therein a plurality of openings through which large pieces of liter may be drawn.

This invention relates to combined floor polishers and cleaners.

It is known to clean floors by first sweeping them and then buffing them with suitable polishing arrangements, but this process suffers from the disadvantage that the buffing disturbs more dust and thus the floor may need sweeping again. It is also known to clean a floor by omitting the initial sweeping process and simply buffing it and then finally dusting it by hand or otherwise. However, this last-mentioned expedient is found to be uneconomical since, although an operator may be able to sweep approximately 1000 square feet of floor area in twelve minutes, approximately a further six minutes per thousand square feet is then required for dusting, and hence it is desirable to be able to clean a floor by initially removing dust and litter from it before any buffing or polishing operation commences.

For this reason, combined buffing and suction cleaning machines have been proposed. However, these have been generally inefficient owing to the nature and quality of the seal between the floor surface and the intake region of the suction device. In this respect an excessive height above floor level of the region of entry to the suction device has usually resulted in too low a velocity of the inwardly-directed dust-laden air, and even when this has not been the case, any high velocity flow which has been present has tended to be in the wrong place, and hence too great a transport distance for relatively large pieces of litter, such as matches and pins, has resulted in the failure of such devices to remove all the dirt and litter from the immediate vicinity of the floor surface in one operation.

In accordance with the invention therefore, a combined floor polisher and suction cleaner comprises, in combination; motor-driven rotatable buffing means mounted within an enveloping housing which terminates in a depending floor-contacting flexible skirt, said housing being connected to motor-driven suction means in turn connected to refuse-collecting means, said flexible skirt being adapted to maintain contact with a floor to be cleaned, despite variations in the angular disposition of said housing with respect to said floor whilst transversed across said floor.

Figure 1:
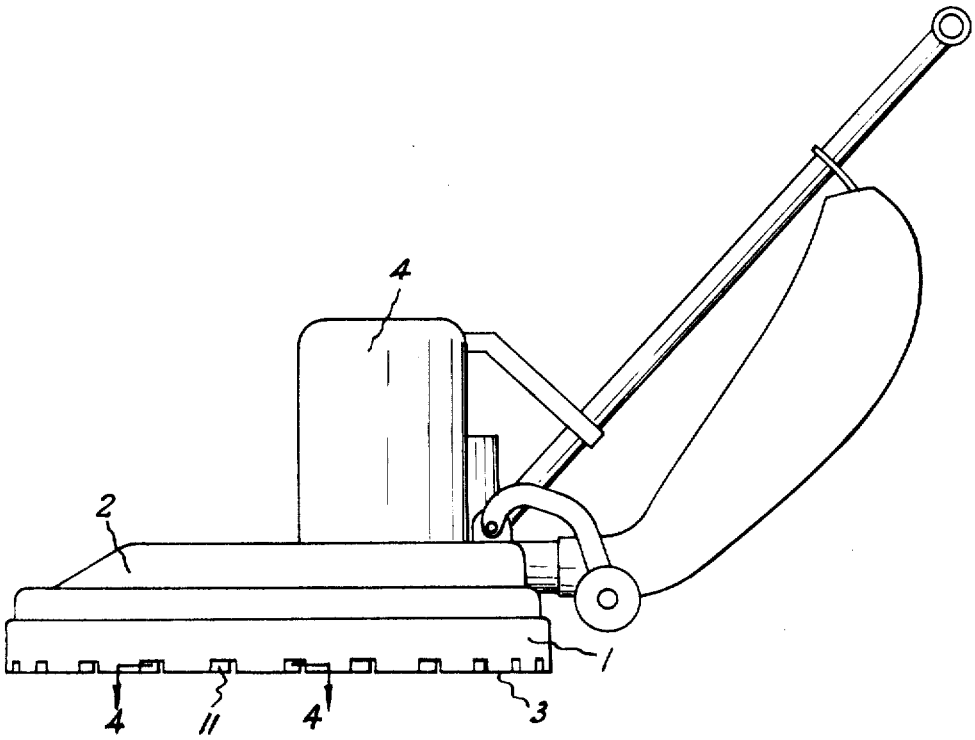
Figure 2:
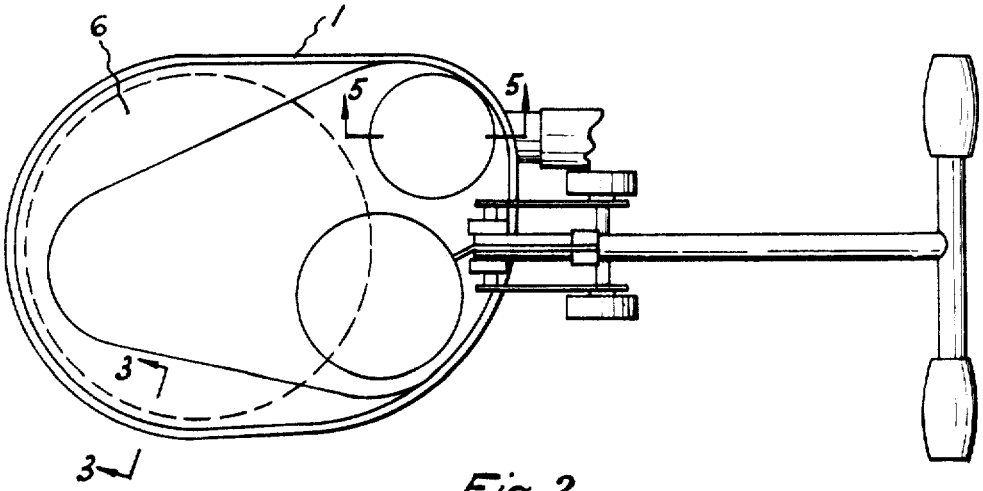
Figure 3:
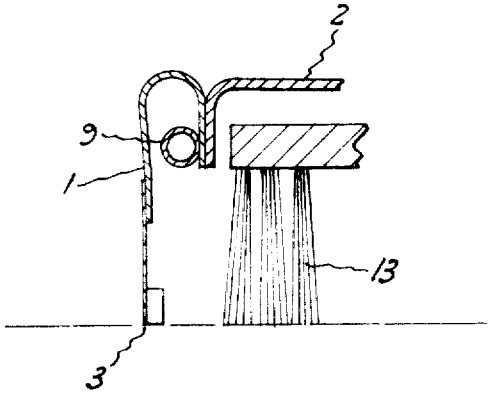
Figure 4:
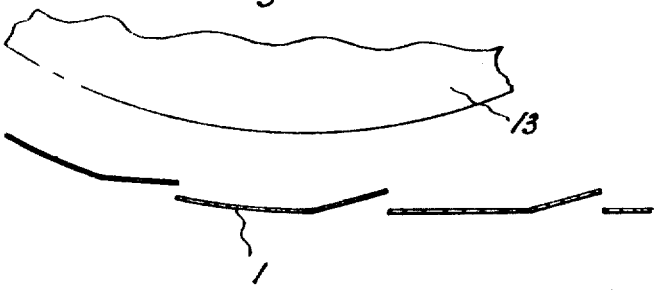
Figure 5:
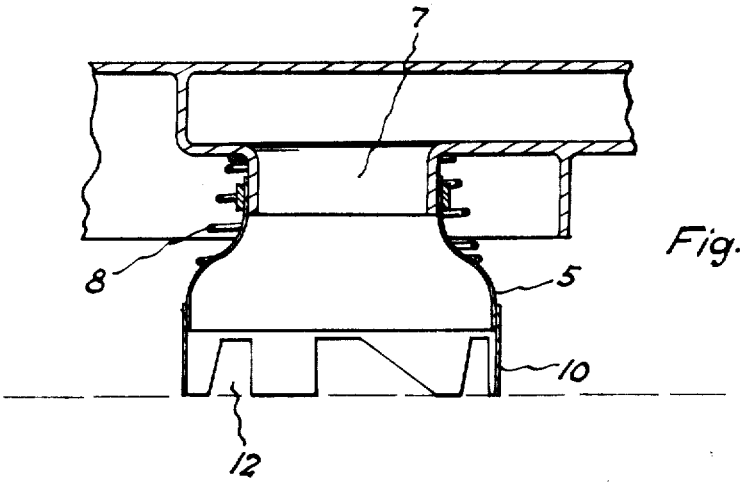

Certain particular embodiments of the invention will now be described with reference to the accompanying drawings, in which similar references indicate corresponding parts, and in which:

FIG. 1 shows, in side elevation, a general view of a combined floor polisher and suction cleaner constructed in accordance with the invention, FIG. 2 shows, in plan view from above, the apparatus of FIG. 1, FIG. 3 shows, in elevation, a section along the line 3—3 of FIG. 2, FIG. 4 shows in plan, and partly in section, a view along the line 4—4 of FIG. 1, and FIG. 5 shows in elevation, and partly in section, a view along the line 5—5 of FIG. 2.

Upon referring to the drawings it will be seen that a skirt 1, which may be constructed from leather or other suitable flexible material, is so formed that it provides a relatively good seal with respect to the floor, so that when the housing 2 is partly evacuated by suction means there is an inward flow of air at high velocity from the part of the floor immediately surrounding the lip 3 of the skirt and into said housing, so as to carry with it any surrounding litter such as dust. However, the seal must not, of course, be too effective because this would prevent any air input to said housing. Thus, the area of the gap between the lip of the skirt and the floor is preset to give a useful volumetric efficiency for the suction system as a whole. This may be achieved, for example, by scalloping or otherwise shaping the lower edge of the lip of the skirt.

Preferably also, a motor (enclosed within the casing 4) which drives the suction means is, in the interests of simplicity, rigidity mounted with respect to the housing 2, and said suction means (the inlet part of which is shown generally in FIG. 5) communicates with the region beneath the flexible skirt by means of a suitable flexible tube 5 which may, for example, be not only capable of bending but also be telescopic by virtue of the provision of radial ribs therein in known manner.

If desired, a separate motor may be provided for the buffing means, adapted to rotate a floor-contacting buff such as 6, so that both said motors may be specifically designed for their own particular purpose. Thus, the motor which drives the suction means should run at a much higher speed than that for the buffing means, and so the necessity for attaching a single motor to one or both of said means via reduction gearing is obviated. However, if a single motor is used, suitable transmission means is provided between said motor and the respective buffing and suction means.

In a preferred form the tube 5 is not formed from stiff material but comprises a flexible skin which communicates with a cheek or inner housing or plenum chamber 7 set to one side of the flexible skirt 1. This skin may be supported by a relatively stiff wire or frame 8 which may, for example, be coiled and mounted inside the skin so as to stand free from it, but is preferably located outside the skin as shown in FIG. 5, or woven into is so to prevent it from collapsing.

The skirt 1 may comprise a main flexible portion composed of leather or similar material and the floor contacting lip 3 may be composed of nylon or similar material of a consistency sufficient to resist wear which may result from contact with a floor surface.

The upper margin of the skirt 1 is attached to the periphery of the housing 2 in such a manner that the cushion 9 is located within a loop of the skirt material thereby preventing damage to said skirt when the outer surface of the latter makes any contact with a wall or the like during operation of the cleaner.

The tube 5 may also be composed of flexible material, such as suede leather, and is provided with a floor contacting lip 10 of material similar to that used in the lip 3. Thus, despite the flexibility of the tube 5, the lip 10 tends to be urged downwardly at al times into contact with the floor by means of the spring 8, even if the suction means as a whole does not possess sufficient weight to ensure this result.

The lip 3 and/or lip 10 may be scalloped or similarly shaped along the margins thereof to assist in the passage of larger pieces of refuse into the region beneath the skirt 1, and also ultimately into the suction means, without interfering substantially with the desirably high velocity of air admitted beneath the lips 3 and 10. Alternately, inlet slots such as 11 may be provided in the lip 3 and similar slots such as 12 in the lip 10. In each case, said slots are directed as shown in FIGS. 1, 4, and 5, so that incoming material, upon hitting the buff 6 or similar rotatable member, has no direct radial path out through said slots on the rebound. Here again, the slots 11 and 12 must not be so large that they interfere with the high velocity input of air which it is an object of the invention to provide.

In order to permit the admission of unusually large articles of refuse to the space beneath the skirt 1, suitable means (not shown) remotely operable by the user of the cleaner may be provided so that at least one edge of said skirt may be lifted temporarily and then dropped again after such articles have been admitted.

It has been found in tests leading to the invention that a combined polisher and suction cleaner, constructed in accordance with the invention, is capable of removing even large litter from any hard flooring surface at the rate of less than four minutes per thousand square feet. Furthermore, it has been found capable of drawing even light dust towards the system throughout its operation, instead of spreading said dust as is the case with conventional dusting.

In a further modification of the invention, the polishing and cleaning combination may be a scrubbing and polishing device. For this purpose, it is preferable that a relatively stiff bristle brush 13 should be installed instead of the buff 6, and also that a suitable inlet valve should be provided for the pump of the suction means so that the latter may be cut off. Alternatively, if the pump and its associated apparatus is constructed from suitable corrosion-resistant materials, and also if the refuse-collecting means is removed; any washing water or other liquid picked up during the scrubbing operation may be allowed to pass through the pump. In an alternative arrangement, a settling trap may be provided between the fan of said pump (the fan being sealed from its associated driving motor) and a filter bag or the like which may be installed between said pump and said refuse-collecting means. If desired, the scrubbing process may initially use wet materials, such as water and detergents, but may terminate as a buffing or polishing process, depending on the nature of the brush selected, and thus a further economy in labour time is effected, since an operator may merely observe that the floor has been scrubbed to a sufficient extent, and then continue to propel the combination machine about the floor until the latter first dries and is then ultimately buffed to a desired extent.

I claim:

1. A combined floor polisher and suction cleaner, comprising, in combination, a housing, motor-driven rotatable buffing means mounted within said housing, a floor-contacting first flexible skirt means depending from the entire periphery of said housing, motor-driven suction means mounted on said housing and connected to refuse-collecting means located within said first skirt means, said first flexible skirt means being adapted to maintain contact wih a floor to be cleaned, despite variations in the angular disposition of said housing with respect to said floor while being traversed across said floor, a second floor-contacting flexible skirt means and a telescopic tube connecting said suction means to said second skirt means, and at least one of said skirt means being provided with at least one inlet slot inclined from the tangential direction of the housing periphery.

2. A combined floor polisher and suction cleaner as claimed in claim 1 further comprising means to bias said second flexible skirt means into contact with the floor which is contacted by said first-mentioned skirt means.

3. A combined floor polisher and suction cleaner as claimed in claim 1, wherein at least one of said flexible skirt means terminates in a relatively durable floor-contacting lip.

4. A combined floor polisher and suction cleaner as claimed in claim 3, wherein said skirts each comprise an upper flexible portion composed of leather and wherein said lips are composed of nylon.

5. A combined floor polisher and suction cleaner as claimed in claim 4, wherein at least one of said nylon lips is scalloped.

6. A combined floor polisher and suction cleaner as claimed in claim 1, further comprising a cushion interposed between the first skirt means and the housing adjacent the peripheral attachment of said first skirt means to said housing.

7. A combined floor polisher and suction cleaner as claimed in claim 1, further comprising means adapted to lift said first skirt means by remote control to admit objects to the region beneath said skirt, the shape and size of which prevents their passage through said slots.

8. A combined floor polisher and suction cleaner as claimed in claim 1, wherein said buffing means is mounted substantially horizontally with respect to said housing.

9. A combined floor polisher and suction clean as claimed in claim 1, wherein said buffing means comprises rotatable brushing means.

10. A combined floor sweeper and suction cleaner as claimed in claim 9, further comprising a settling trap disposed between said suction means and said refuse-collecting means whereby said cleaner is adapted for wet scrubbing.

*11. A combined polisher and suction cleaner comprising a housing enclosing motor-driven rotatable buffing means, motor-driven suction means mounted on said housing, and a flexible floor-contacting skirt depending from the periphery of said housing and adapted to maintain contact with the floor despite variations in the angular disposition of the housing with respect to the floor while being traversed across the floor, said suction means communicating with a region enclosed by the said flexible skirt, said skirt defining in its floor-contacting edge a plurality of litter inlet slots, an obstructing surface inwardly from said slots defining a non-radial entrance path, thereby to allow the entrance of litter but to prevent its escape after ricochetting from said buffing means.*

*12. The device of claim 11 in which the obstructing surface inwardly of the slots is formed by inwardly bending a portion of the skirt.*

*13. A combined polisher and suction cleaner comprising a housing enclosing motor-driven rotatable buffing means, motor-driven suction means mounted on said housing; and a flexible floor-contacting skirt depending from the periphery of said housing and adapted to main-*

*tain contact with the floor despite variations in the angular disposition of the housing with respect to the floor while being traversed across the floor, said suction means communicating with a region enclosed by the said flexible skirt, a plurality of litter inlet slots in the floor contacting edge of said skirt, said slots being inclined to the periphery of the housing so as to allow the entrance of litter but to prevent its escape after ricochetting from said buffing means.*

*14. The device of claim 13 in which the slots are formed by inwardly bending a portion of the skirt.*

References Cited

The following references, cited by the Examiner, are of record in the patented file of this patent or the original patent.

UNITED STATES PATENTS

| | | | |
|---|---|---|---|
| 2,250,177 | 7/1941 | Boccasile | 15—320 |
| 2,680,260 | 6/1954 | Danielsson et al. | 15—320 X |
| 2,801,437 | 8/1957 | Okun | 15—328 X |
| 3,148,397 | 9/1964 | Kuchar et al. | 15—325 R |
| 3,226,759 | 1/1966 | Wörwag | 15—328 |
| 3,264,674 | 8/1966 | Doyle et al. | 15—320 X |
| 3,375,540 | 4/1968 | Hyde | 15—328 X |

FOREIGN PATENTS

| | | | |
|---|---|---|---|
| 1,083,994 | 6/1960 | Germany | 15—325 |

HARVEY C. HORNSBY, Primary Examiner

C. K. MOORE, Assistant Examiner

U.S. Cl. X.R.

15—325, 420